United States Patent Office 3,738,930
Patented June 12, 1973

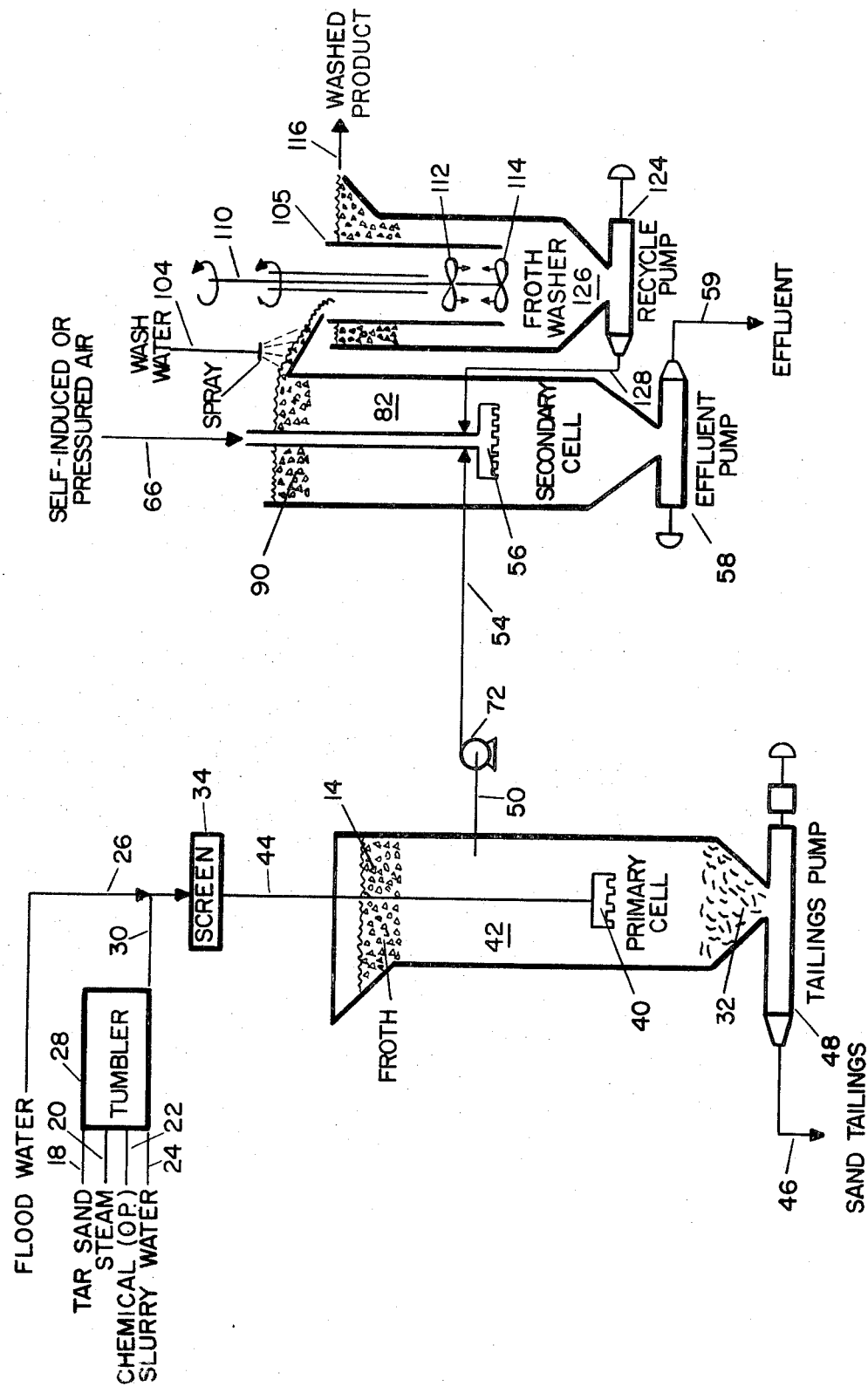

3,738,930
SECONDARY FROTH WASH
Victor Paul Kaminsky, Edmonton, Alberta, Canada, assignor to Canada-Cities Service, Ltd., Imperial Oil Limited, Atlantic Richfield Canada, Ltd., and Gulf Oil Canada Limited, fractional part interest to each
Filed Mar. 2, 1972, Ser. No. 231,349
Int. Cl. C10g 1/04
U.S. Cl. 208—11                                       6 Claims

ABSTRACT OF THE DISCLOSURE

Disclosed herein is a process to reduce the amount of solids in a secondary froth to a level which is economical by subjecting the secondary froth to a water washing operation wherein the froth is deaerated, collapsed and subjected to intimate contacting with fresh hot water. The contacting causes the bitumen contained within the froth to allow the release of the solids entrained within the bitumen, the water to separate from the bitumen, and the recovery of bitumen from the secondary froth.

BACKGROUND OF THE INVENTION

The present invention involves a process for the removal of bitumen from secondary froth formed during the hot water processing of Athabasca tar sands. More particularly, the process of the present invention utilizes the intimate contacting of a hot water wash with a secondary froth and subsequent intimate contacting of the bitumen with the fresh hot water in order to accomplish a separation of the bitumen from the solid materials and water for the recovery of bitumen from the secondary froth.

Various methods have been proposed for separating bitumen from tar sand. The two best known methods are often referred to as the "hot water method" and the "cold water method." In the former, the bituminous sand is jetted with steam or hot water and mulled with a small proportion of water at about 175° F., and the pulp is then dropped into a turbulent stream of circulating water and carried through a separation cell maintained at an elevated temperature of about 180° F. In the separation cell, entrained air causes the oil to rise to the top in the form of a froth rich in bitumen which is then drawn off while sand settles to the bottom of the cell. A middlings layer of water contaminated with bitumen and find solids also forms in the separation cell and may be further treated in a secondary separation cell for recovery of additional bitumen therefrom.

The so-called "cold water method" does not involve heating the bituminous sand other than whatever heating might be required to conduct the operation at room temperature. The process involves mixing the bituminous sand with water, soda ash and an organic solvent such as kerosene. The mixture is then permitted to settle at room temperature. A mixture of water and bitumen dissolved in the organic solvent rises to the top of the settling zone and is recovered.

In the operation of water separation processes of the type described above, it is desirable to obtain a bituminous froth containing maximum quantities of bitumen and minimum quantities of water and solids. Removal of water and solids from the froth is difficult and expensive. On the other hand, attempts to operate the process so as to reduce the amount of solids and water contained in the froth usually result in excessive quantities of bitumen passing from the process with waste streams, thereby reducing recovery of bitumen and increasing the pollution problem associated with waste material.

Considerable amounts of bitumen, from 10 to 25% of the total, is normally removed with the middlings and may be charged to secondary recovery cells for the recovery of the bitumen entrained in the middlings. To insure high bitumen recovery, the secondary cell is operated as a subaeration cell having a high degree of aeration. This results in a variable and voluminous secondary froth product which contains relatively large amounts of solids and water, generally on an average of 25 to 150 pounds per 100 pounds of bitumen product. This froth must be beneficially concentrated and the bitumen upgraded. Conventional cleanup equipment, such as cyclones and centrifuges, are solids limiting and therefore are not normally utilized in cleaning large amounts of froth as hard to treat as secondary froth. What is required, then, is a process wherein secondary-separator froth may be subjected to an additional hot water wash in order to remove solids entrained in the secondary separator froth.

It is an object of the present invention to provide a process for the recovery of bitumen from middlings water.

It is another object of the present invention to provide a process wherein bitumen losses to the tailings of waste material may be minimized by minimizing the amount of water removed with the trailings and thereby increasing bitumen recovery.

It is a further object of the present invention to provide a secondary-separator froth wash wherein fresh hot water and secondary-separator froth are intimately contacted in order to reduce the solids and water content of secondary-separator froth.

It is still a further object of the present invention to provide a process to reduce the amount of solids in a secondary froth to a concentration which allows an economic recovery of bitumen therefrom.

With these and other objects in mind, the present invention may be more readily understood by referral to the accompanying figure and the following discussions:

SUMMARY OF THE INVENTION

The objects of the present invention are accomplished through utilization of a process for recovering bitumen from a secondary-separator froth stream produced from the aeration of a primary-separator middlings stream during the processing of Athabasca tar sands. The process comprises washing the secondary-separator froth stream with fresh hot water. The secondary-separator froth is intimately contacted with hot water to cause deaeration of the froth and separation of the entrained water and solids from the secondary-separator froth. The washed bitumen is separated from the water and solids as product and may be recycled to combine with the primary-separator froth for the further recovery of bitumen. It is preferred, when utilizing the process of the present invention, that the washing step utilize fresh hot water rates between about 1 and about 15 pounds of water per pound of solid in the secondary-separator froth. It is further preferred that there be intimate contacting of the fresh hot water with the secondary-separator froth. This is best accomplished by stirring. Provisions for the addition of surfactant to the fresh hot water stream for further separational improvement may also be included within the process of the present invention.

BRIEF DESCRIPTION OF THE DRAWING

The present invention may be more readily understood by referral to the accompanying figure in which the primary, secondary and washing circuits are depicted, illustrating the process of the present invention for the recovery of bitumen from a secondary-separator froth stream.

DETAILED DESCRIPTION OF THE INVENTION

The process of the present invention obviates the utilization of a cyclone or centrifuge froth cleanup operation in order to reduce the amount of solids in a secondary froth to a concentration which becomes economically feasible. In the process of the present invention a separation of water and solids from the bitumen in a secondary-separator froth is accomplished by froth water washing equipment. The specific operation of the process of the present invention may be more readily understood by referral to the accompanying figure in which a primary-secondary-washing circuit is disclosed wherein raw tar sand 18 is introduced with steam 20, optional chemical addition 22, and slurry water 24 into a tumbler 28. Flood water 26 is added to the slurry 30 produced in tumbler 28. The flooded slurry is passed through a screen 34 and enters the separation cell 42 through conduit 44 and a dispersing device 40.

The water-bitumen-sand mixture introduced into the separation cell 42 separates into a bitumen enriched primary-separator froth 14 at the top of the cell 42 and the solid materials 32 accumulate through settling at the bottom of the separation cell 42 and are removed as sand tailings 46 by pump 48. In order to minimize the bitumen losses to the sand tailings 46 the amount of water removed with the sand tailings must be minimized. Since the aggregate amount of water removed from the separation cell 42 by way of the primary-separator froth 14 and sand tailings 46 is less than the total amount introduced into the separation cell as slurry, the excess water must be removed through some other port. This is accomplished by withdrawing a middlings stream 50 by pump 72 and reintroducing the middlings stream into a secondary-separation cell 82 via conduit 54. A dispersing device 56 located in the secondary separation cell 82 causes bitumen from the middlings to contact self-induced or pressured air 66 and form a buoyant voluminous secondary froth 90. Most of the solids settle to the bottom of the secondary cell 82 and are removed by the effluent pump 58 through conduit 59. Because of excessive aeration in the secondary cell 82, the secondary-separator froth 90 contains large amounts of water and solid matter which must be removed. These contaminants are removed from the secondary-separator froth 90 by overflowing the froth into a froth washer 126. The secondary-separator froth 90 is contacted by a hot water spray 104 which may contain chemicals, for example a surfactant comprising a sulfonated petroleum fraction therein. The spray of fresh hot water 104 deaerates the secondary-separator froth 90 and becomes a carrier for the the collapsed froth that is introduced within the froth washer 126.

The collapsed froth and spray water mixture is passed into the baffle mixing chamber 105 of the froth washer 126 to allow intimate contacting between the bitumen and the fresh hot water so as to accomplish a separation of the bitumen from the solids-water mixture. This intimate contacting may be enhanced by the imposition of two opposite throw marine-type propellers. The upper propeller 112 forces the bitumen water mixture downward where it meets an upward moving stream produced by the lower up-throw type marine propeller 114. Propellers 112 and 114 may be rotated by shaft 110 powered by an auxiliary motor, not depicted herein. The colliding streams impart a washing action which releases solids entrained in and with the bitumen flakes. The down-throw vector of the upper propeller 112 is designed to be larger than the lower up-throw propeller, thereby assuring a positive feed through-flow from the agitated zone and into the quiescent settling zone outside the mixing zone 105. The function of the draft tube 105, contained within the froth water, is to insure a positive directional flow past both propellers and prevent short circuiting of the bitumen into the settling zone. The froth-hot water mixture is confined for maximum bitumen-water contact and provides a quiescent settling zone below the propellers and outside the draft tube 105 for the inversion of bitumen to reform into a more concentrated froth.

The washer effluent 128 may be recycled through recycle pump 124 to the secondary cell 82 for scavenging any bitumen losses or the washer effluent may be returned to the primary extraction cell as flood water. If chemicals such as sodium hydroxide or sodium tripolyphosphate and other surfactants are added to the wash water 104, the effluent may be recycled to the tumbler 28 as slurry water for the residual chemicals to have a beneficial effect on the primary extraction. Washed bitumen product 116 may be combined with the primary-separator froth for further treatment.

For example of the utilization of the process of the present invention, the following experimental examples are presented:

EXAMPLE I

A washer similar to that shown in the accompanying figure; consisting of a 7-inch by 7-inch by 16-inch high vessel with a 60° pyramidal cone at the bottom was utilized as a froth washer. Secondary froth was introduced with the aid of a hot water spray to a 4-inch diameter, 14-inch long draft tube within the froth washer. Within the draft tube were positioned two opposed throw 3-inch flat vane marine-type propellers. The vanes of the upper (down-throw) propeller were set at 18° from the horizontal and the lower (up-throw) propeller was set at 15° from the horizontal. A 3-inch separation between the propellers was accomplished with the lower propeller being positioned approximately 2 inches above the lower end of the draft tube. The draft tube confined the washing action and separated the agitated zone and the quiescent settling area below the propellers.

Based on an average of 25 pounds of solids per 100 pounds of bitumen in the secondary froth, the effect of wash water upon the deaeration and separation thereof is shown in Table I. It can be readily seen that the contaminants in the secondary froth may be reduced to less than 10 lbs. of solids and approximately 50 lbs. water per 100 lbs. of bitumen by the washing process with the use of less than 15 lbs. fresh water per lb. of solids in the secondary froth. Losses to the recycle stream are reclaimed in a scavenging step.

TABLE I.—EFFECTS OF WASH WATER RATES ON BITUMEN LOSS

| Water rate (lbs./lb. of solid in froth) | Washed froth quality at— | | Bitumen lost to recycle stream (percent of total) |
|---|---|---|---|
|  | 100 s/o | 100 w/o |  |
| 3.6 | 9.7 | 53.8 | 7.4 |
| 7.4 | 8.7 | 42.9 | 8.1 |
| 14.0 | 7.3 | 46.7 | 15.9 |

Based on the results of Table I, an experiment was conducted using 7.4 pounds of fresh water per pound of solids in a secondary froth washing scheme. Table II depicts the results of this experiment at various temperatures and shows that higher washing temperatures produce the best quality froths although the bitumen losses to the recycle stream increased with an increase in washing temperature. Washing temperatures of approximately 180° F. are preferred as a compromise between good froth quality and low bitumen losses to the recycle stream.

TABLE II.—EFFECT OF TEMPERATURE IN FROTH QUALITY AND BITUMEN LOSSES

| Temperature (° F.) | Froth quality at— | | Bitumen lost to recycle stream (percent of total) |
|---|---|---|---|
|  | 100 s/o | 100 w/o |  |
| 100 | 13.4 | 69.6 | 7.4 |
| 150 | 11.6 | 62.4 | 7.1 |
| 180 | 8.7 | 42.9 | 8.1 |
| 200 | 5.0 | 37.5 | 11.6 |

EXAMPLE 2

In order to determine the degree of agitation and mixing required with the equipment identified in Example 1 at the optimum temperature of 180° F. wash temperature and 7.4 pounds of water per pound of solids in the secondary froth, various impeller velocities were tested in order to determine an optimum recovery of bitumen from the froth and an optimum loss of bitumen to the recycle stream. Table III depicts the quantities shown. Therefore, it can be seen that higher impeller speeds produce better quality froths and increase bitumen losses to the recycle stream. The bitumen losses to the recycle stream are, however, recovered by reaeration after recycle to the secondary-separator cell.

TABLE III.—EFFECT OF AGITATION ON BITUMEN LOSS

| Impeller velocity (ft./min.) | Froth quality at— | | Bitumen lost to recycle stream (percent of total) |
|---|---|---|---|
| | 100 s/o | 100 w/o | |
| 235 | 13.8 | 152.0 | 4.8 |
| 470 | 12.8 | 126.3 | 6.5 |
| 705 | 9.6 | 54.7 | 7.4 |
| 940 | 8.0 | 50.1 | 7.3 |

Generally, from the experiments, it can be seen that higher impeller speeds, high wash water rates and higher wash water temperatures yield the best quality froths. However, these same conditions also produce a very finely dispersed bitumen in the water emulsion and a potential for high bitumen losses to the recycle streams if the washer effluent is discarded. In practice, it has been preferred that the washer effluent be recycled to the secondary vessel which then also serves as a scavenger cell for recovery of the potential bitumen losses.

While the invention has been described above with respect to certain embodiments thereof, it will be understood by those skilled in the art that various changes and modifications may be made without departing from the spirit and scope of the invention as set forth herein.

Therefore I claim:
1. A process for recovering bitumen from a secondary-separator froth stream produced from the aeration of a primary-separator middlings stream during the processing of Athabasca tar sand, which comprises:
    (a) washing the secondary-separator froth stream with fresh hot water;
    (b) intimately contacting the secondary-separator froth stream with said fresh hot water to cause deaeration and separation of the water and solids from the bitumen; and
    (c) separating the washed bitumen product from the solids and water.
2. The process of claim 1 wherein the washing step utilizes fresh hot water rates between about 1.0 and about 15.0 pounds of water per pound of solids in the froth washer.
3. The process of claim 2 wherein the intimate contacting of the fresh hot water with the secondary-separator froth stream is accomplished by stirring.
4. The process of claim 1 further comprising recycling the deaerated froth to combine with the primary-separator froth stream.
5. The process of claim 1 further comprising the addition of a surfactant to the fresh hot water.
6. The process of claim 1 further comprising the recycling of the spent wash water to an earlier step in the processing of the tar sand.

References Cited
UNITED STATES PATENTS

| | | | |
|---|---|---|---|
| 3,070,541 | 12/1962 | Price | 208—11 |
| 3,401,110 | 9/1968 | Floyd et al. | 208—11 |
| 3,530,041 | 9/1970 | Erskine et al. | 208—11 |

CURTIS R. DAVIS, Primary Examiner